United States Patent
Radhakrishnan et al.

(10) Patent No.: US 8,488,061 B2
(45) Date of Patent: Jul. 16, 2013

(54) DERIVING VIDEO SIGNATURES THAT ARE INSENSITIVE TO PICTURE MODIFICATION AND FRAME-RATE CONVERSION

(75) Inventors: Regunathan Radhakrishnan, Daly City, CA (US); Claus Bauer, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 532 days.

(21) Appl. No.: 12/600,466

(22) PCT Filed: May 1, 2008

(86) PCT No.: PCT/US2008/005588
§ 371 (c)(1),
(2), (4) Date: Mar. 9, 2010

(87) PCT Pub. No.: WO2008/143768
PCT Pub. Date: Nov. 27, 2008

(65) Prior Publication Data
US 2010/0238350 A1    Sep. 23, 2010

Related U.S. Application Data

(60) Provisional application No. 60/930,905, filed on May 17, 2007.

(51) Int. Cl.
*H04N 5/14* (2006.01)
*H04N 9/64* (2006.01)

(52) U.S. Cl.
USPC .................................................. 348/571

(58) Field of Classification Search
None
See application file for complete search history.

(56) References Cited

U.S. PATENT DOCUMENTS

| | | | |
|---|---|---|---|
| 5,019,899 A * | 5/1991 | Boles et al. | 725/22 |
| 5,465,353 A | 11/1995 | Hull et al. | |
| 5,870,754 A | 2/1999 | Dimitrova et al. | |
| 2004/0240562 A1 | 12/2004 | Bargeron et al. | |
| 2005/0018925 A1* | 1/2005 | Bhagavatula et al. | 382/278 |
| 2005/0175224 A1 | 8/2005 | Venkatesan et al. | |
| 2006/0184963 A1* | 8/2006 | Snijder et al. | 725/37 |

OTHER PUBLICATIONS

J. Fridrich and M. Goljan "Robust Hash Functions for Digital Watermarking" Proceedings International Conference on Information Technology: Coding and Computing, 2000.*

* cited by examiner

*Primary Examiner* — Jeffeery Harold
*Assistant Examiner* — Michael Teitelbaum

(57) ABSTRACT

A signature that can be used to identify video content in a series of video frames is generated by first calculating the average and variance of picture elements in a low-resolution composite image that represents a temporal and spatial composite of the video content in the series of frames. The signature is generated by applying a hash function to values derived from the average and variance composite representations. The video content of a signal can be represented by a set of signatures that are generated for multiple series of frames within the signal. A set of signatures can provide reliable identifications despite intentional and unintentional modifications to the content.

15 Claims, 3 Drawing Sheets

DERIVING VIDEO SIGNATURES THAT ARE INSENSITIVE TO PICTURE MODIFICATION AND FRAME-RATE CONVERSION

TECHNICAL FIELD

The present invention pertains generally to the processing of video signals and pertains more specifically to processes that extract features from video signals to identify the signals. Throughout this disclosure, the terms "video signals" and "video content" refer to signals and content that represent images intended for visual perception.

BACKGROUND ART

Applications that attempt to detect authorized and unauthorized video content of a received signal often rely on processes that analyze the content of the received signal to generate some type of content identifier or signature. These applications use results from the analysis to determine whether the received content is a copy of some reference content. For many of these applications, it is important to obtain a reliable identification even when the content of the received signal has been modified unintentionally or intentionally so that it differs from the reference content but can still be recognized by a human observer as being substantially the same as the reference content. If the perceived difference between the reference content and the modified content is small, then preferably the signature-generation process should generate signatures from the reference and modified content that are very similar to one another.

Examples of unintentional modifications to signal content include the insertion or addition of noise to signals in transmission channels and on storage media. Examples of intentional modifications to video signals include luminance and color modifications such as contrast/brightness adjustments, gamma correction, luminance histogram equalization, color saturation adjustments and color correction for white balancing, include geometric modifications such as image cropping and resizing, image rotation and flipping, stretching, speck removal, blurring, sharpening and edge enhancement, and include coding techniques such as lossy compression and frame rate conversion.

DISCLOSURE OF INVENTION

It is an object of the present invention to provide identification processes that can be used to obtain a reliable identification of video content even if the content has been modified by mechanisms such as those mentioned above.

This object is achieved by the present invention that is described below.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

A. Introduction

Various aspects of the present invention may be used advantageously in a system for identifying video content by analyzing segments of that content and generating a signature for each segment. The signatures generated for the segments in an interval of a signal form a signature set, which can be used as a reliable identification of the content in that interval. The following disclosure first describes processes that may be used to generate a signature for a single segment and then describes the generation and use of signature sets.

Figure 1:
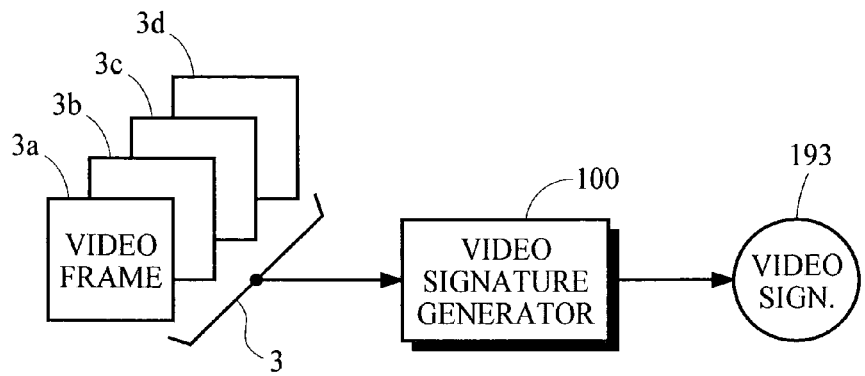
FIGS. 1 and 2 are schematic block diagrams of a video signature generator that may be used to obtain a reliable identification of a video signal.

FIG. 1 is a schematic block diagram of a video signature generator 100 that analyzes the video content in a signal segment 3 to generate a video signature 193 that identifies or represents that content. In the example shown, the segment 3 includes a series of video frames 3a to 3d. If the video signal conveys audio content as well as video content, an audio signature that represents the audio content may be obtained by processing the audio content in a variety of ways including those disclosed in U.S. provisional patent application No. 60/872,090 entitled "Extracting Features of Video and Audio Signal Content to Provide a Reliable Identification of the Signals" by Regunathan Radhakrishnan, et al., filed on Nov. 30, 2006, which is incorporated herein by reference in its entirety.

B. Video Signature Extractor

Figure 2:
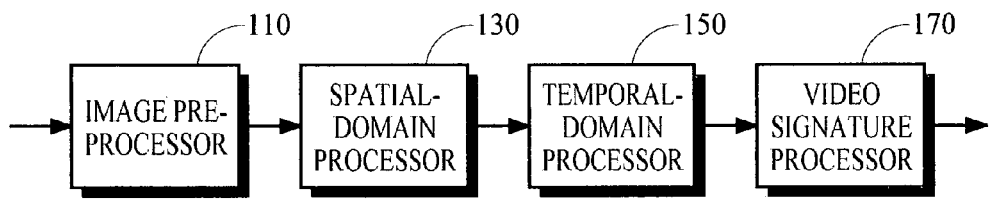

One implementation of the video signal generator 100 is illustrated in FIG. 2. In this implementation, an image pre-processor 110 obtains a series of format-independent images for the pictures conveyed in the frames 3a, 3b, 3c, 3d, a spatial-domain processor 130 down-samples the format-independent images to generate a series of lower-resolution representations of the format-independent images, a temporal-domain processor 150 generates values that represent a composite of the series of lower-resolution representations, and a video signature processor 170 applies a hash function to the composite values to generate the video signature 193 that represents and identifies the content of the segment 3. The processing that is performed by the processors 110, 130, 150 and 170 may be implemented in a variety of ways. Preferred implementations of these processes are described below.

1. Image Pre-Processor

For one exemplary implementation, each video frame 3a, 3b, 3c, 3d in the segment 3 conveys a picture that is represented by an array of pixels D. The image pre-processor 110 derives a format-independent image of the picture for each frame. The format-independent image is represented by an array of pixels F. The derivation of the format-independent image may be done in a variety of ways. A few examples are described below.

In one application, the video signature generator 100 generates signatures for television video signals that convey video content in a variety of formats including progressive-scan and interlaced-scan with the standard-definition (SD) resolution of 480×640 pixels and the high-definition (HD) resolution of 1080×1920 pixels. The image pre-processor 110 converts the picture in each frame into a format-independent image that has a format common to all signal formats of interest. In preferred implementations, the pixels F in the format-independent images are obtained by down-sampling the pixels D in the frame to reduce sensitivity to modifications that can occur when frames of video are converted between different formats.

In one example, the resolution of the format-independent image is chosen to have a resolution of 120×160 pixels, which is a convenient choice for television signals conveying images in HD and SD resolutions for both progressive-scan interlaced-scan formats. The image pre-processor 110 converts SD-format video content into format-independent images by down-sampling the pixels in each frame picture by a factor of four. The image pre-processor 110 converts HD-format video content into format-independent images by cropping each frame picture to remove 240 pixels from the left-hand edge and 240 pixels from right-hand edge to obtain an interim image with a resolution of 1080×1440 pixels and down-sampling the pixels in the interim image by a factor of nine.

If a video signal conveys content in an interlaced-scan format in which frames of video are arranged in two fields, the signal may be converted into a progressive-scan format before obtaining the format-independent image. Alternatively, greater independence from the choice of scan format can be achieved by obtaining the format-independent image from only one of the fields in an interlaced-scan frame. For example, the format-independent image can be obtained from only the first field in each frame or from only the second field in each frame. Video content in the other field can be ignored. This process avoids the need to convert to a progressive-scan format before obtaining the format-independent image.

If appropriate cropping and down sampling is used, the resultant image is essentially independent of the frame picture format so that the subsequent signature generation process is insensitive to different formats and to modifications that occur from conversions between formats. This approach increases the likelihood that a video signature generated from a series of format-independent images will correctly identify the video content in a series of frame pictures even if those pictures have been subjected to format conversion.

Preferably, the format-independent image excludes picture areas that are likely to be affected by intentional modifications. For video applications such as television, for example, this may be achieved by cropping to exclude corners and edges of the image where logos or other graphical objects may be inserted into the video content.

Figure 3:
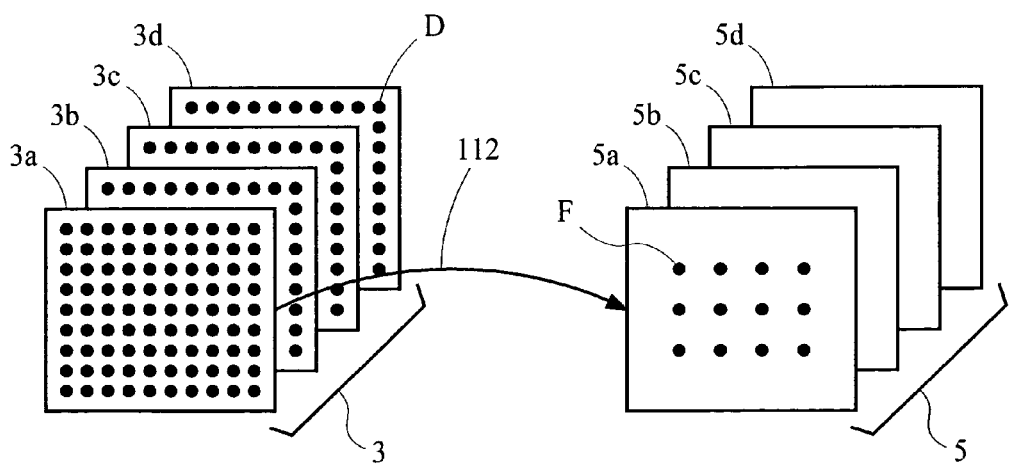
FIG. 3 is a schematic block diagram of a process performed in one implementation of an image pre-processor.

FIG. 3 provides a schematic illustration of the results obtained by a process 112 performed by the image pre-processor 110 that includes the cropping and down-sampling operations described above. The picture in the frame 3a within the segment 3 is cropped to extract the pixels D in a central portion of the picture. The pixels D in this central portion are down-sampled to obtain the pixels F in the format-independent image 5a. A format-independent image 5a, 5b, 5c, 5d in a series of images 5 is obtained for each frame 3a, 3b, 3c, 3d in the segment 3. The process 112 may be expressed as:

$$\{F_m\} = IP[\{D_m\}] \text{ for } 0 \leq m < M \quad (1)$$

where
$\{F_m\}$=the set of pixels in the format-independent image for frame in;
IP[ ]=the image pre-processor operations applied to the picture in frame m;
$\{D_m\}$=the set of pixels in the picture for frame m; and
M=the number of frames in the segment.

The cropping operation that resizes a picture for format conversion may be combined with or performed separately from the cropping operation that excludes areas of a picture that may be affected by intentional modification such as the insertion of logos. The cropping operations may be performed before or after the down-sampling operations. For example, the format-independent image may be obtained by cropping video content and subsequently down sampling the cropped images, it can be obtained by down sampling the video content and subsequently cropping the down-sampled images, and it can be obtained by a down-sampling operation performed between the two cropping operations mentioned above.

If each video frame conveys a color image comprising pixels represented by red, green and blue (RGB) values, for example, a separate format-independent image may be obtained for each of the red, green, and blue values in each frame. Preferably, one format-independent image is obtained for each frame from the luminance or brightness of pixels that is derived from the red, green, and blue values in the frame. If each video frame conveys a monochromatic image, the format-independent image may be obtained from the intensities of the individual pixels in that frame.

2. Spatial-Domain Processor

Figure 4:
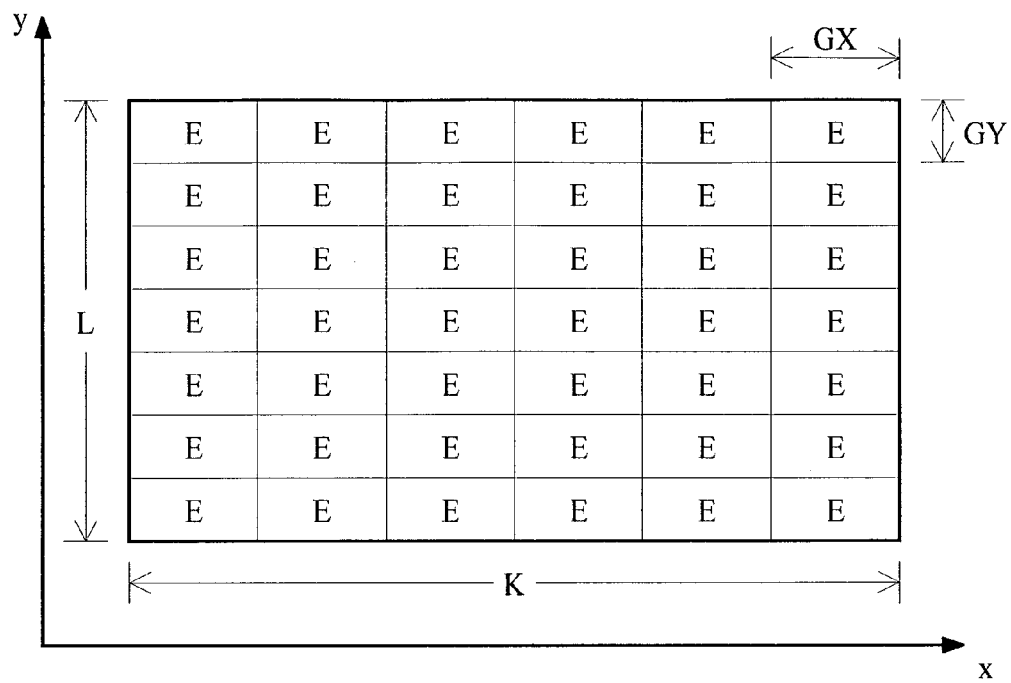
FIG. 4 is a schematic block diagram of a lower-resolution image obtained by a spatial-domain processor.

In an exemplary implementation, the spatial-domain processor 130 obtains a down-sampled lower-resolution representation of the format-independent images by grouping the pixels F in each of the format-independent images into regions that are GX pixels wide and GY pixels high. A lower-resolution image with picture elements E is derived from the intensities of the pixels F in a respective format-independent image by calculating the average intensity of the pixels in each region. Each lower-resolution image has a resolution of K×L elements. This is illustrated schematically in FIG. 4. The picture elements E may be obtained by performing a process that implements the following expression:

$$E_m(k, l) = \frac{1}{GX \cdot GY} \sum_{i=k \cdot GX}^{(k+1) \cdot GX - 1} \sum_{j=l \cdot GY}^{(l+1) \cdot GY - 1} F_m(i, j) \quad (2)$$

for $0 \leq k < K; 0 \leq l < L; 0 \leq m < M$ where
$E_m(k,l)$=a picture element in the lower-resolution image for frame m;
GX=the width of pixel groups expressed in numbers of pixels F;
GY=the height of pixel groups expressed in numbers of pixels F;
K=the horizontal resolution of the lower-resolution image;
L=the vertical resolution of the lower-resolution image; and
$F_m(i,j)$=a pixel in the format-independent image for frame m.

The horizontal size GX of the groups is chosen such that K·GX=RH and the vertical size GY of the groups is chosen such that L; GY=RV where RH and RV are the horizontal and vertical resolutions of the format-independent image, respectively. For the exemplary implementation discussed above that generates elements in a down-sampled format-independent image with a resolution of 120×160 pixels, one suitable size for the groups is 8×8, which provides a lower-resolution image with a resolution of 120/8×160/8=15×20 picture elements.

Alternatively, the grouping performed by the spatial-domain processor 130 can be combined with or performed prior to processing performed by the image pre-processor 110.

By using the lower-resolution picture elements E to generate a video signature rather than the higher-resolution pixels F, the generated video signature is less sensitive to processes that change details of video signal content but preserve average intensity.

3. Temporal-Domain Processor

In an exemplary implementation of the temporal-domain processor 150, values that represent a composite of the series of lower-resolution images are obtained from the temporal averages and variances of respective picture elements E.

The temporal average $Z(k,l)$ of each respective picture element $E(k,l)$ may be calculated from the following expression:

$$Z(k, l) = \frac{1}{M} \sum_{m=0}^{M-1} E_m(k, l) \text{ for } 0 \leq k < K; 0 \leq l < L \quad (3a)$$

Alternatively, the video content of selected frames within the segment 3 may be given greater importance by calculating the temporal averages from a weighted sum of the picture elements as shown in the following expression:

$$Z(k, l) = \frac{1}{M} \sum_{m=0}^{M-1} w_m \cdot E_m(k, l) \text{ for } 0 \leq k < K; 0 \leq l < L \quad (3b)$$

where $w_m$=the weighting factor for picture elements in the lower-resolution image derived from the video content of frame in.

If desired, the time-domain process represented by expression 3a or 3b may be performed prior to the spatial-domain process represented by expression 2.

The value $Z(k,l)$ represents an average intensity for each picture element $E(k,l)$ over both time and space; therefore, these average values do not convey much information about any motion that may be represented by the video content of the segment 3. A representation of motion may be obtained by calculating the variance of each picture element $E(k,l)$.

If the average value $Z(k,l)$ for each picture element $E(k,l)$ is calculated as shown in expression 3a, the variance $V(k,l)$ of each respective picture element $E(k,l)$ may be calculated from the following expression:

$$V(k, l) = \frac{1}{M} \sum_{m=0}^{M-1} (E_m(k, l) - Z(k, l))^2 \text{ for } 0 \leq k < K; 0 \leq l < L \quad (4a)$$

If the average value for each picture element is calculated as shown in expression 3b, the variance $V(k,l)$ of each respective picture element $E(k,l)$ may be calculated from the following expression:

$$V(k, l) = \frac{1}{M} \sum_{m=0}^{M-1} (w_m \cdot [E_m(k, l) - Z(k, l)])^2 \quad (4b)$$

for $0 \leq k < K; 0 \leq l < L$

In a preferred implementation, the values that represent a composite of the series of lower-resolution images are the values of elements in two rank matrices Z, and V, that are derived from the temporal average and variance arrays Z and V, respectively. The value of each element in the rank matrices represents the rank order of its respective element in the associated arrays. For example, if the element $Z(2,3)$ is the fourth largest element in the average value array Z, the value of the corresponding element $Z(2,3)$ in the rank matrix $Z_r$ is equal to 4. For this preferred implementation, the composite values QZ and QV may be expressed as:

$$QZ(k,l)=Z_r(k,l) \text{ for } 0 \leq k<K; 0 \leq l<L \quad (5)$$

$$QV(k,l)=V_r(k,l) \text{ for } 0 \leq k<K; 0 \leq l<L \quad (6)$$

The use of rank matrices is optional. In an alternate implementation, the values that represent a composite of the series of lower-resolution images are the values of the elements in the temporal average and variance arrays Z and V. For this alternate implementation, the composite values QZ and QV may be expressed as:

$$QZ(k,l)=Z(k,l) \text{ for } 0 \leq k<K; 0 \leq l \leq L \quad (7)$$

$$QV(k,l)=V(k,l) \text{ for } 0 \leq k<K; 0 \leq l<L \quad (8)$$

4. Video Signature Processor

The video signature processor 170 applies a hash function to K×L arrays of the composite values QZ and QV to generate two sets of hash bits. A combination of these two sets of hash bits constitute the video signature that identifies the content of the segment 3. Preferably, the hash function is relatively insensitive to changes in the composite values and more sensitive to changes in any hash key that may be used. Unlike a typical cryptographic hash function whose output changes significantly with a change to even a single bit of its input, a preferred hash function for this application provides an output that undergoes only small changes for small changes in the input composite values. This allows the generated video signature to change only slightly with small changes to video content.

One suitable hash function uses a set of $N_z$ base matrices to generate a set of $N_z$ hash bits for the QZ composite values, and uses a set of $N_V$ base matrices to generate a set of $N_V$ hash bits for the QV composite values. Each of the base matrices is a K×L array of elements. These elements represent a set of vectors that preferably are orthogonal or nearly orthogonal to one another. In the implementation described below, the elements of the base matrices are generated by a random-number generator under the assumption that these elements represent a set of vectors that are nearly orthogonal to one another.

The matrix elements $pz_n(k,l)$ of each base matrix $PZ_n$ for use with the composite values QZ may be generated from the following expression:

$$pz_n(k,l) = RGN - \bar{p}_n \text{ for } 1 \leq n \leq N_Z, 0 \leq k < K, 0 \leq l < L \quad (9)$$

where RNG=the output of a random-number generator; and
$\bar{p}_n$=the average value of the numbers generated by RNG for each matrix.

The matrix elements $pv_n(k,l)$ of each base matrix $PV_n$ for use with the composite values QV may be generated from the following expression:

$$pv_n(k,l) = RGN - \bar{p}_n \text{ for } 1 \leq n \leq N_V, 0 \leq k < K, 0 \leq l < L \quad (10)$$

The generator RNG generates random or pseudo-random values that are uniformly distributed in the range [0,1]. The initial state of the generator may be initialized by a hash key, which allows the hash function and the generated video signature to be cryptographically more secure.

One set of hash bits $BZ_n$ is obtained by first projecting the composite values QZ onto each of the $N_z$ base matrices, which may be expressed as:

$$HZ_n = \sum_{k=0}^{K-1} \sum_{l=0}^{L-1} QZ(k,l) \cdot pz_n(k,l) \text{ for } 1 \leq n \leq N_Z \quad (11)$$

where $HZ_n$=the projection of the composite values QZ onto the base matrix $PZ_n$. The set of hash bits $BZ_n$ is then obtained by comparing each projection to the median value of all projections and setting the hash bit to a first value if the projection is equal to or exceeds the threshold and setting the hash bit to a second value if the projection is less than the threshold. One example of this process may be expressed as: where $$BZ_n = \text{sgn}(HZ_n - \bar{H}_Z) \quad (12)$$

$$\text{sgn}(x) = \begin{cases} 0 & \text{for } x < 0 \\ 1 & \text{for } x \geq 0 \end{cases} \text{ and}$$

$\bar{H}_Z$=the median value of all projections $HZ_n$.

Another set of hash bits $BV_n$ is obtained in a similar manner as shown in the following expressions:

$$HV_n = \sum_{k=0}^{K-1} \sum_{l=0}^{L-1} QV(k,l) \cdot pv_n(k,l) \text{ for } 1 \leq n \leq N_V \quad (13)$$

$$BV_n = \text{sgn}(HV_n - \bar{H}_v) \quad (14)$$

where $HV_n$=the projection of the composite values QV onto the base matrix $PV_n$; and
$\bar{H}_v$=the median value of all projections $HV_n$.

The video signature is obtained from a concatenation of the two sets of hash bits, which forms a value that has a total bit length equal to $N_Z+N_V$. The values for $N_Z$ and $N_V$ may be set to provide the desired total bit length as well as weight the relative contribution of the composite values QZ and QV to the final video signature. In one application mentioned above that generates video signatures for television signals, $N_Z$ and $N_V$ are both set equal to eighteen.

C. Applications

1. Signature Sets

A signature generated by the video signature generator 100 represents the video content of the segment from which the signature was generated. A reliable identification of the video content in an interval of a signal much longer than a segment can be obtained by generating a set of signatures for the segments included in that interval.

Figure 5:
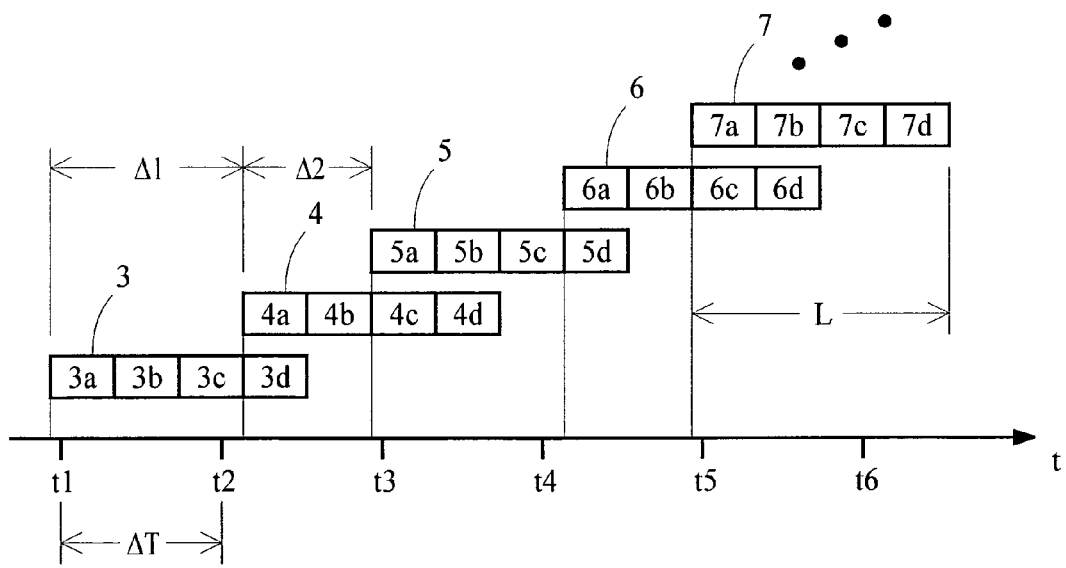
FIG. 5 is a schematic block diagram of video frames arranged in segments.

The diagram shown in FIG. 5 is a schematic illustration of an interval of a signal that includes several segments of video frames. Five segments are shown. The first segment 3 of the signal includes video frames 3a to 3d. Each subsequent segment 4, 5, 6, 7 includes video frames 4a to 4d, 5a to 5d, 6a to 6d and 7a to 7d, respectively. A set of signatures can be generated for these segments by using the video signal generator 100 to process the contents of the video frames in each segment as described above.

Each segment contains an integral number of video frames. Preferably, the series of frames in each segment conveys video content for an interval of time that is equal to a nominal length L or within one frame period of the nominal length L. The term "frame period" refers to the duration of the video content conveyed by one frame. The nominal start times t# for successive segments are separated from one another by an offset ΔT. This offset may be set equal to the frame period of the lowest frame rate of signals to be processed by the video signature generator 100. For example, if the lowest rate to be processed is twelve frames per second, the offset ΔT may be set equal to 1/12 sec. or about 83.3 msec.

The nominal length L may be chosen to balance competing interests of decreasing the sensitivity of the subsequently-generated video signature to content modifications such as frame-rate conversion and increasing the temporal resolution of the representation provided by the video signature. Empirical studies have shown that a nominal segment length L that corresponds to about two seconds of video content provides good results for many applications.

The specific values mentioned for the segment length L and the offset amount ΔT are only examples. If the offset ΔT is not equal to an integer number of frame periods, the offset between the actual start times of successive segments can vary as shown in the figure by the different offset amounts Δ1 and Δ2. If desired, the length of the offset between actual start times may kept within one frame period of the nominal offset ΔT.

Figure 6:
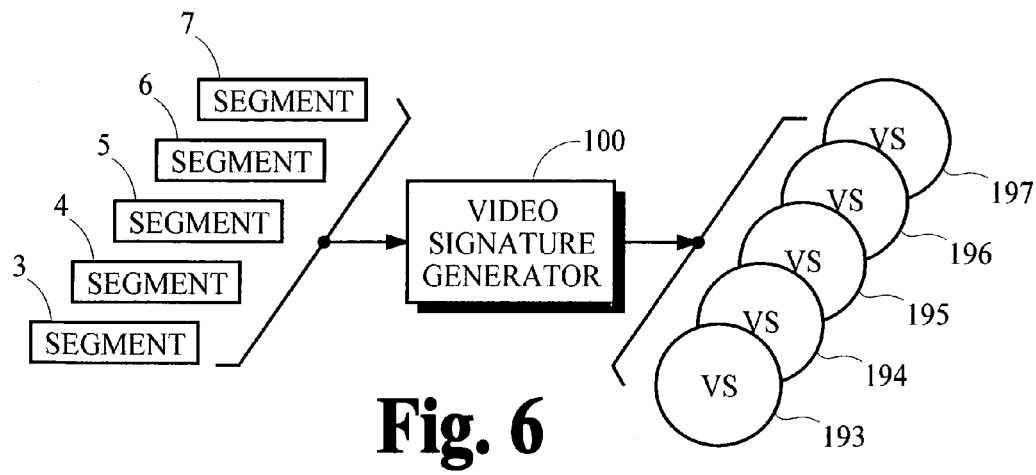
FIG. 6 is a schematic block diagram of a video signature generator processing segments of video content to generate a set of video signatures.

FIG. 6 is a schematic block diagram showing a set of video signatures 193 to 197 that are generated from the video content of segments 3 to 7, respectively. Referring to FIGS. 5 and 6, the video signature generator 100 obtains the video content of the segment 3 starting at the nominal start time t1 and processes this video content to generate the video signature 193. The video signature generator 100 then obtains the video content of the segment 4 starting at the nominal start time t2 and processes this video content to generate the video signature 194. The generator continues by processing the video content in segments 5, 6 and 7, which begin at nominal start times t3, t4 and t5, respectively, to generate the video signatures 195, 196 and 197. Signatures may be generated for essentially any number of segments that may be desired.

The nominal start times do not need to correspond to any particular time data that may accompany the video content. In principle, the alignment between the nominal start times and the video content is arbitrary. For example, in one implementation the nominal start times are expressed as relative offsets from the beginning of a signal to be processed. Each segment begins with the video frame conveying video content having a start time that is closest to its respective nominal start time. Alternatively, each segment could begin with the video frame that spans the nominal start time for that segment. Essentially any alignment between beginning frame and nominal start time may be used.

2. Detection of Copies

The signature sets generated from segments of video content can be used to identify the content even when that content has been modified by a variety of processes including those mentioned above. The ability to determine reliably whether specified video content is a copy of a reference content, even when modified, can be used in a variety of ways including the following:

Detection of unauthorized copies: Networks of peer-to-peer servers can facilitate the distribution of content but they can also increase the difficulty of detecting unauthorized or pirated copies of proprietary content because many copies of the content can exist among the peer-to-peer servers. A facility can automatically determine if any unauthorized copies exist in the network by generating signature sets for all content available from the network and checking these signature sets against a data base of reference signature sets.

Confirmation of broadcast: Businesses that contract with broadcast networks to distribute specified video content can confirm the terms of the contract were met by generating signature sets from signals received by a broadcast receiver and comparing these signature sets to reference signature sets for the specified content.

Identification of reception: Businesses that provide ratings for broadcast networks can identify content that is received by a receiver by generating signature sets from the received signals and comparing those signature sets against reference signature sets.

Figure 7:
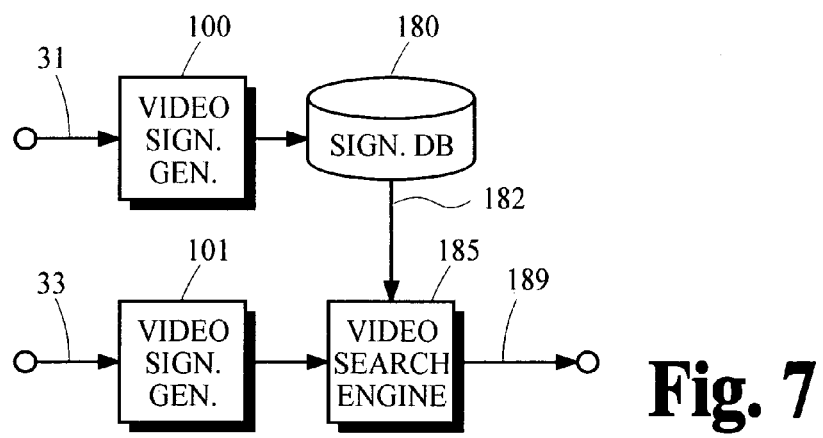
FIG. 7 is a schematic block diagram of a system that manages a signature data base for detection of copies of video content.

FIG. 7 is a schematic block diagram of a system that may be used to implement a variety of applications such as those mentioned in the preceding list. The video signature generator 100 generates reference video signature sets from reference streams of video content received from the path 31. The generated reference video signature sets are stored in the signature data base 180. The reference signature sets may be stored with other information that may facilitate implementation of the application. For example, the reference signature sets may be stored with the underlying content itself or with information about the content such as the content owner, content licensing terms, title of the content or a textual description of the content. Each reference signature set has a data base search key. This key may be derived in any manner that may be desired. Preferably, the key is based on or derived from the signatures in the associated reference signature set.

Any specified video content may be checked against reference content represented by one or more signature sets stored in the signature data base. The content to be checked is referred to herein as the test content. The identity of the test video content may be checked by having the video signature generator 101 generate one or more test video signature sets from the test video content received from the path 33 and passing the test video signature sets to the video search engine 185. The video search engine 185 attempts to find reference video signature sets in the signature data base 180 that are exact or close matches to the test video signature sets.

In one implementation, the video search engine 185 receives one or more test signature sets from the video signature generator 101. Each test signature set includes an ordered series of test signatures $S_{TEST}$ in the order in which they were generated from the test content. The video search engine 185 receives reference signature sets from the signature data base 180 via the path 182. Each reference signature set includes an ordered series of reference signatures $S_{REF}$ in the order in which they were generated from the corresponding reference content. The video search engine 185 determines the similarity between test content and a particular reference content by calculating a measure of dissimilarity DSM between the test signature set for the test content and the reference signature set for the particular reference content. This measure of dissimilarity DSM is derived from the Hamming distances between corresponding signatures in the series of signatures for the test signature set and the reference signature set for the particular reference content. This measure may be calculated in a number of ways including either of the following expressions:

$$DSM = \sum_{s=1}^{M} (HD[S_{REF}(s), S_{TEST}(s)]) \quad (15a)$$

$$DSM = \sqrt{\sum_{s=1}^{M} (HD[S_{REF}(s), S_{TEST}(s)])^2} \quad (15b)$$

where DSM=the calculated measure of dissimilarity;
HD[x,y]=the Hamming distance between signatures x and y;
$S_{REF}(s)$=the s-th signature in the series of reference signatures; and
$S_{TEST}(s)$=the s-th signature in the series of test signatures.

The video search engine 185 searches the signature data base 180 for the reference signature set that yields the smallest measure of dissimilarity with the test signature set. The reference content associated with this reference signature set is the most likely candidate in the data base to share a common origin with the test content. If the measure of dissimilarity is less than some classification threshold, the test content associated with the test signature set is deemed to share a common origin with or be a copy of the reference content that is associated with the matching reference signature set. Empirical results suggest that good results can be obtained for a variety of video content using if the series of signatures in each signature set represent about two seconds of video content.

For ease of explanation in the following discussion, test content and some specified reference content are said to be "matching" if the test content shares a common origin with the specified reference content.

The value that is chosen for the classification threshold mentioned above affects the likelihood that test and reference content will be correctly recognized as either matching or not matching each other. It also affects the likelihood that an incorrect decision is made. The probability of an "incorrect negative decision" that matching content will be incorrectly classified as content that does not match increases as the value of the classification threshold decreases. Conversely, the probability of an "incorrect positive decision" that non-matching content will be incorrectly classified as content that does match increases as the value of the classification threshold increases.

The classification threshold may be set in any way that may be desired. One method that may be used to set the value of the classification threshold obtains the original video content that is represented by a reference signature set in the data base 180 and creates a number of copies of this original content. The copies are modified in a variety of ways such as by frame-rate conversion and any of the other intentional and unintentional modifications described above. The method generates a test signature set for each copy and calculates a first set of measures of dissimilarity DSM between the test signature sets and the reference signature set. The method also calculates a second set of measures of dissimilarity DSM between the test signature sets and the signature sets for other video content that do not share a common origin with the original content. The range of values in the two sets may not overlap. If they do overlap, the amount of overlap is typically a very small portion of the range of values in each set. The classification threshold is set to a value within the overlap or between the two ranges if they do not overlap. This threshold value may be adjusted according to the needs of the application to balance the risk of incurring either incorrect positive or incorrect negative decisions.

D. Implementation

Figure 8:
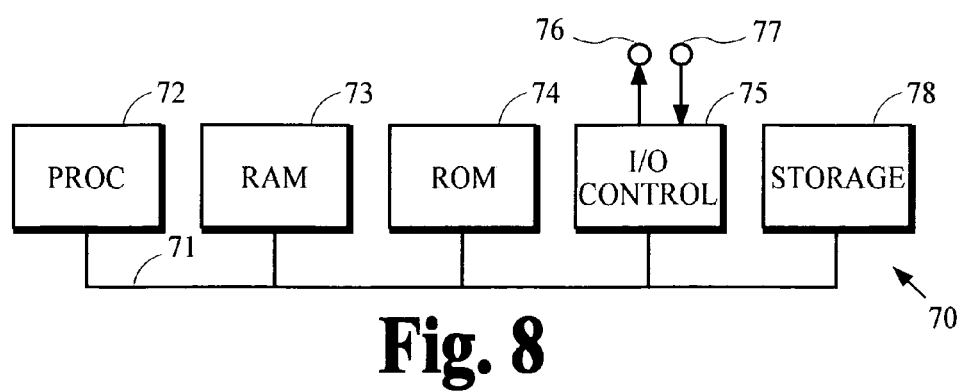
FIG. 8 is a schematic block diagram of a device that may be used to implement various aspects of the present invention.

Devices that incorporate various aspects of the present invention may be implemented in a variety of ways including software for execution by a computer or some other device that includes more specialized components such as digital signal processor (DSP) circuitry coupled to components similar to those found in a general-purpose computer. FIG. 8 is a schematic block diagram of a device 70 that may be used to implement aspects of the present invention. The processor 72 provides computing resources. RAM 73 is system random access memory (RAM) used by the processor 72 for processing. ROM 74 represents some form of persistent storage such as read only memory (ROM) for storing programs needed to operate the device 70 and possibly for carrying out various aspects of the present invention. I/O control 75 represents interface circuitry to receive and transmit signals by way of the communication channels 76, 77. In the embodiment shown, all major system components connect to the bus 71, which may represent more than one physical or logical bus; however, a bus architecture is not required to implement the present invention.

In embodiments implemented by a general purpose computer system, additional components may be included for interfacing to devices such as a keyboard or mouse and a display, and for controlling a storage device 78 having a storage medium such as magnetic tape or disk, or an optical medium. The storage medium may be used to record programs of instructions for operating systems, utilities and applications, and may include programs that implement various aspects of the present invention.

The functions required to practice various aspects of the present invention can be performed by components that are implemented in a wide variety of ways including discrete logic components, integrated circuits, one or more ASICs and/or program-controlled processors. The manner in which these components are implemented is not important to the present invention.

Software implementations of the present invention may be conveyed by a variety of machine readable media such as baseband or modulated communication paths throughout the spectrum including from supersonic to ultraviolet frequencies, or storage media that convey information using essentially any recording technology including magnetic tape, cards or disk, optical cards or disc, and detectable markings on media including paper.

The invention claimed is:

1. A method that comprises:
receiving video signal segments each containing a series of frames and conveying video content representing a series of pictures with a specified resolution, wherein nominal start times for successive video signal segments are offset from one another by a nominal time offset and actual start times for the successive video signal segments are offset from one another by an offset that is within one frame period of being equal to the nominal time offset, a frame period being the duration of the video content conveyed by one frame;
processing the video content conveyed by each video signal segment to calculate a first array of composite values for an average of picture elements in a series of low-resolution images and to calculate a second array of composite values for a variance of picture elements in the series of low-resolution images, each low-resolution image representing at least a portion of a respective picture in the series of pictures with a resolution that is lower than the specified resolution; and
generating for the video signal content of each video signal segment a respective signature that identifies the video content of the respective video signal segment by projecting a set of values obtained from the first and second arrays of composite values for the respective video signal segment onto a set of base matrices, wherein dimensions of the first array, the second array and the base matrices are the same and each base matrix is an array of elements having pseudo-random values, and setting a value of a bit in a signature set of bits for each respective projection according to whether the respective projection is less than a median value of all projections, thereby obtaining a signature set of bits that identifies the video content of the video signal segments.

2. The method of claim 1, wherein each value in the set of values is equal to a respective composite value.

3. The method of claim 1 that comprises obtaining the set of values from rank matrices for the composite values.

4. The method of claim 1 that comprises calculating the composite values by cropping and down-sampling the series of pictures and generating the picture elements from averages of intensities for groups of pixels in the low-resolution images, wherein the specific resolution of the series of pictures is one of a plurality of resolutions and each low-resolution image has a size and resolution that is common for all resolutions in the plurality of resolutions.

5. The method of any one of claims 1 through 4 that comprises:
obtaining a first signature set of bits that identifies the video content of video signal segments of a first video signal, the video signal segments of the first video signal conveying video content in frames having a first frame period and representing a series of pictures with a first resolution;
obtaining a second signature set of bits that identifies the video content of video signal segments of a second video signal, the video signal segments of the second video signal conveying video content in frames having a second frame period and representing a series of pictures with a second resolution , wherein the second frame period does not equal the first frame period; and
deriving a measure of dissimilarity between the first signature set of bits and the second signature set of bits to determine whether the first video signal and the second video signal convey video content representing respective series of pictures originating from a common source of pictures.

6. An apparatus that comprises:
- means for receiving video signal segments each containing a series of frames and conveying video content representing a series of pictures with a specified resolution, wherein nominal start times for successive video signal segments are offset from one another by a nominal time offset and actual start times for the successive video signal segments are offset from one another by an offset that is within one frame period of being equal to the nominal time offset, a frame period being the duration of the video content conveyed by one frame;
- means for processing the video content conveyed by each video signal segment to calculate a first array of composite values for an average of picture elements in a series of low-resolution images and for calculating a second array of composite values for a variance of picture elements in the series of low-resolution images, each low-resolution image representing at least a portion of a respective picture in the series of pictures with a resolution that is lower than the specified resolution; and
- means for generating for the video signal content of each video signal segment a respective signature that identifies the video content of the respective video signal segment by projecting a set of values obtained from the first and second arrays of composite values for the respective video signal segment onto a set of base matrices, wherein dimensions of the first array, the second array and the base matrices are the same and each base matrix is an array of elements having pseudo-random values, and setting a value of a bit in a signature set of bits for each respective projection according to whether the respective projection is less than a median value of all projections, thereby obtaining a signature set of bits that identifies the video content of the video signal segments.

7. The apparatus of claim 6, wherein each value in the set of values is equal to a respective composite value.

8. The apparatus of claim 6 that comprises means for obtaining the set of values from rank matrices for the composite values.

9. The apparatus of claim 6 that comprises means for calculating the composite values by cropping and down-sampling the series of pictures and generating the picture elements from averages of intensities for groups of pixels in the low-resolution images, wherein the specific resolution of the series of pictures is one of a plurality of resolutions and each low-resolution image has a size and resolution that is common for all resolutions in the plurality of resolutions.

10. The apparatus of any one of claims 6 through 9 that comprises:
- means for obtaining a first signature set of bits that identifies the video content of video signal segments of a first video signal, the video signal segments of the first video signal conveying video content in frames having a first frame period and representing a series of pictures with a first resolution;
- means for obtaining a second signature set of bits that identifies the video content of video signal segments of a second video signal, the video signal segments of the second video signal conveying video content in frames having a second frame period and representing a series of pictures with a second resolution, wherein the second frame period does not equal the first frame period; and
- means for deriving a measure of dissimilarity between the first signature set of bits and the second signature set of bits to determine whether the first video signal and the second video signal convey video content representing respective series of pictures originating from a common source of pictures.

11. A non-transitory medium recording a program of instructions that is executable by a device to perform a method that comprises:
- receiving video signal segments each containing a series of frames and conveying video content representing a series of pictures with a specified resolution, wherein nominal start times for successive video signal segments are offset from one another by a nominal time offset and actual start times for the successive video signal segments are offset from one another by an offset that is within one frame period of being equal to the nominal time offset. a frame period being the duration of the video content conveyed by one frame;
- processing the video content conveyed by each video signal segment to calculate a first array of composite values for an average of picture elements in a series of low-resolution images and to calculate a second array of composite values for a variance of picture elements in the series of low-resolution images, each low-resolution image representing at least a portion of a respective picture in the series of pictures with a resolution that is lower than the specified resolution; and
- generating for the video signal content of each video signal segment a respective signature that identifies the video content of the respective video signal segment by projecting a set of values obtained from the first and second arrays of composite values for the respective video signal segment onto a set of base matrices, wherein dimensions of the first array, the second array and the base matrices are the same and each base matrix is an array of elements having pseudo-random values, and setting a value of a bit in a signature set of bits for each respective projection according to whether the respective projection is less than a median value of all projections, thereby obtaining a signature set of bits that identifies the video content of the video signal segments.

12. The medium of claim 11, wherein each value in the set of values is equal to a respective composite value.

13. The medium of claim 11, wherein the method comprises obtaining the set of values from rank matrices for the composite values.

14. The medium of claim 11, wherein the method comprises calculating the composite values by cropping and down-sampling the series of pictures and generating the picture elements from averages of intensities for groups of pixels in the low-resolution images, wherein the specific resolution of the series of pictures is one of a plurality of resolutions and each low-resolution image has a size and resolution that is common for all resolutions in the plurality of resolutions.

15. The medium of any one of claims 11 through 14, wherein the method comprises:
- obtaining a first signature set of bits that identifies the video content of video signal segments of a first video signal, the video signal segments of the first video signal conveying video content in frames having a first frame period and representing a series of pictures with a first resolution;
- obtaining a second signature set of bits that identifies the video content of video signal segments of a second video signal, the video signal segments of the second video signal conveying video content in frames having a second frame period and representing a series of pictures with a second resolution , wherein the second frame period does not equal the first frame period; and deriving a measure of dissimilarity between the first signature set of bits and the second signature set of bits to determine whether the first video signal and the second video signal convey video content representing respective series of pictures originating from a common source of pictures.

* * * * *